Dec. 7, 1943.                C. P. DEIBEL ET AL                2,336,229
                                   BATTERY
                        Filed May 30, 1942          3 Sheets-Sheet 1
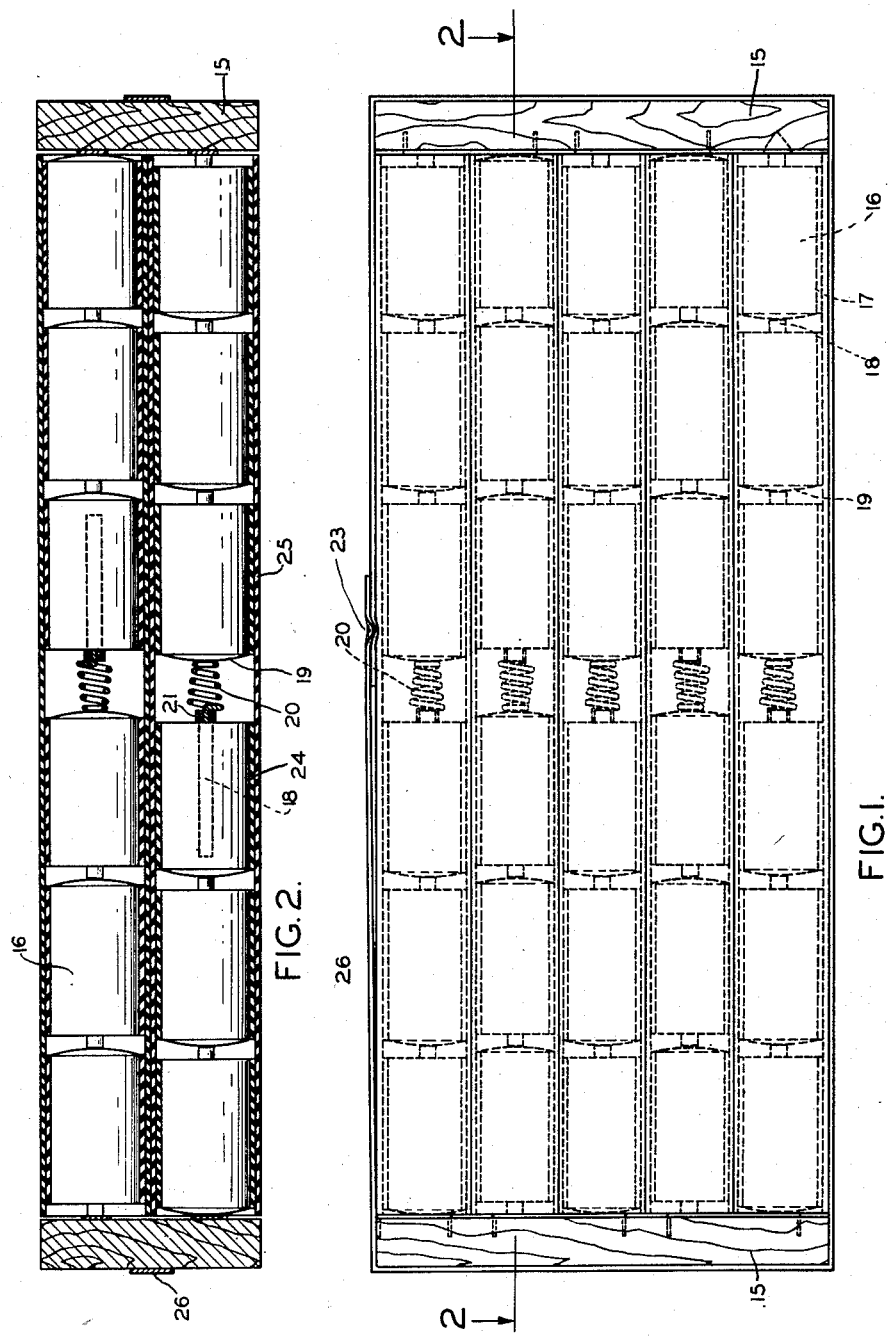
INVENTOR.
CYRIL P. DEIBEL & LEWIS A. GRAY.
BY
ATTORNEYS.

Dec. 7, 1943.  C. P. DEIBEL ET AL  2,336,229
BATTERY
Filed May 30, 1942   3 Sheets-Sheet 2
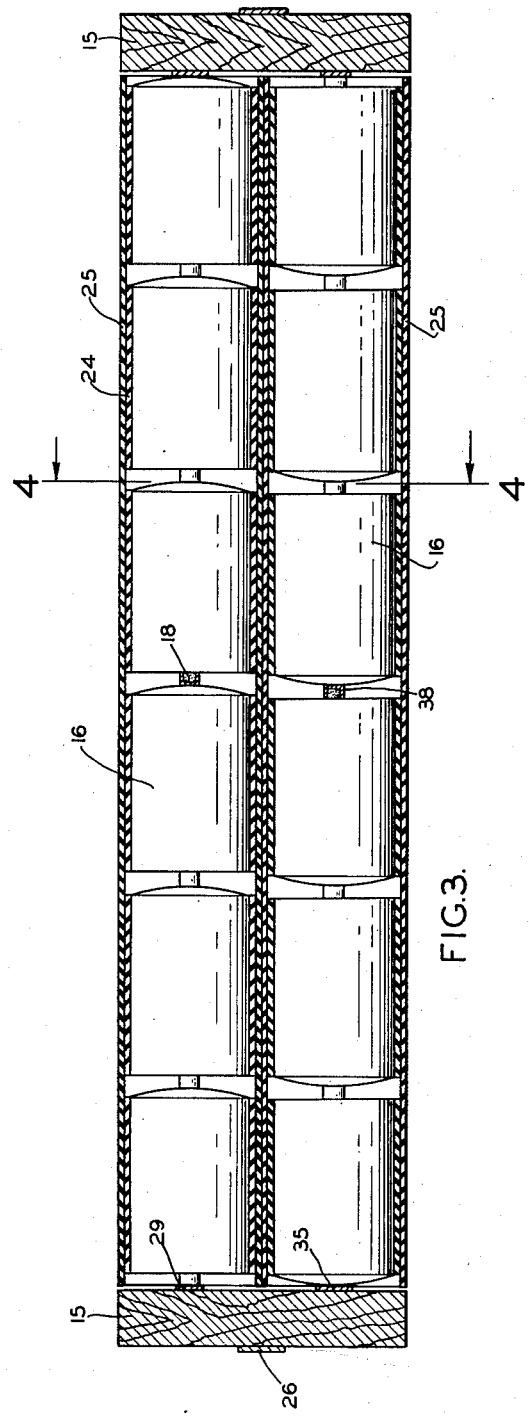
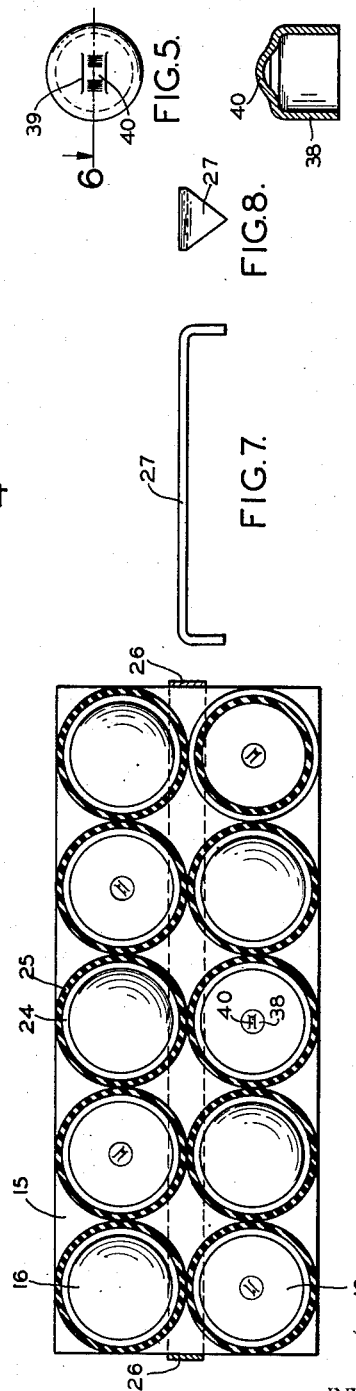
INVENTOR.
CYRIL P. DEIBEL & LEWIS A. GRAY.
BY
ATTORNEYS.

Dec. 7, 1943.  C. P. DEIBEL ET AL  2,336,229
BATTERY
Filed May 30, 1942  3 Sheets-Sheet 3

INVENTOR.
CYRIL P. DEIBEL & LEWIS A. GRAY.
BY Fay, Macklin, Golrick
Williams, Chilton and Isler.
ATTORNEYS Patented Dec. 7, 1943

2,336,229

UNITED STATES PATENT OFFICE 2,336,229

BATTERY

Cyril P. Deibel and Lewis A. Gray, Lakewood, Ohio; said Gray assignor to said Deibel Application May 30, 1942, Serial No. 445,136

1 Claim. (Cl. 136—108)

The present invention relates to a so-called B battery such as are used for radio equipment.

In the ordinary battery of that type the dry cells are arranged in rows with their tops and bottoms being in the same horizontal planes respectively. For connecting the cells in series, the top of the first cell has to be connected to the bottom of the second cell, the top of that cell to the bottom of the third and so on through the whole battery. This manner of connecting the single cells involves a great deal of wiring and soldering, a drawback which has been seriously felt in the manufacture of batteries for a long time.

Our invention is intended to overcome the above mentioned inconvenience by a novel arrangement of the cells. One of the main objects of the invention is to provide a dry cell battery unit of the character described in which the number of soldered connections and the amount of copper wire, as well as the number of brass caps required, are reduced to a minimum, thus effecting a great saving in both labor and material.

According to our novel arrangement a number of cells are stacked one on top of the other to form a pile unit and several of these units may in turn be combined to form the battery. By disposing the cells in this way, one positive pole is directly connected to the negative pole of the next cell without any wiring or soldering being required in each row of stacked cells. As already mentioned several rows may then be combined in one battery to attain the required voltage without having to pile up cells extending for too great a length in one direction.

In the accompanying drawings:

Fig. 1 is a front view of the battery according to the invention;

Fig. 2 is a section taken on line 2—2 of Fig. 1;

Fig. 3 shows another embodiment of the invention in a sectional view similar to Fig. 2;

Fig. 4 is a section of Fig. 3 on line 4—4;

Fig. 5 is a detail view of a cap on the carbon electrode;

Fig. 6 shows a section taken along line 6—6 of Fig. 5;

Figs. 7 and 8 are side and end views respectively of a connecting strip;

Figure 11:
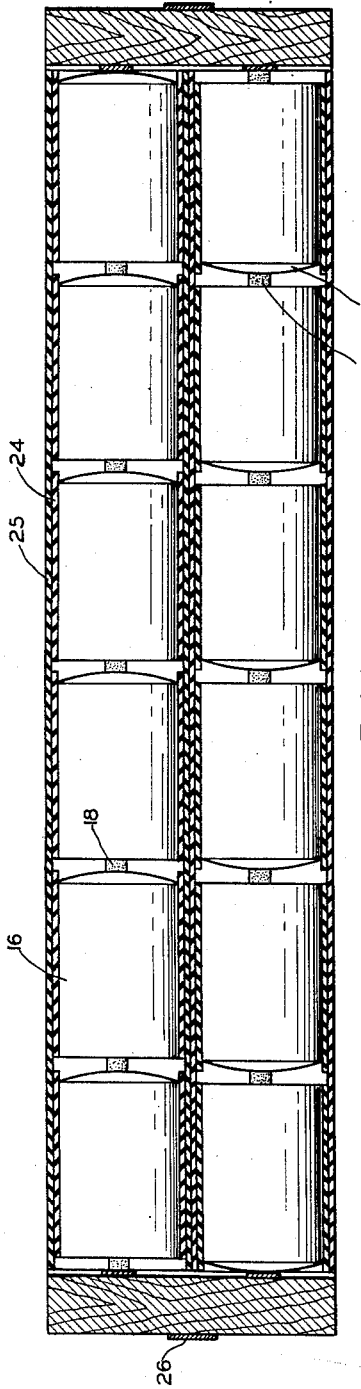
Fig. 11 is yet another embodiment of the invention.

Referring more particularly to Figs. 1 and 2, the battery is shown as including two wooden blocks 15, one at each end, between which the piles of cells 16 are disposed. The cells are the ordinary type of dry cells consisting of a zinc cup 17 forming the negative pole and containing the usual mass of mix through the center of which a carbon rod 18 extends forming the positive pole. The carbon electrode protrudes beyond the open end of cup 17 and may be covered by a brass cap 21 (Fig. 2). Each cell 16 is covered by a paper tube 24.

As seen from the drawings ten piles of stacked dry cells 16 are used for building the battery in the embodiment here shown. Each unit comprises six cells disposed three to the right hand side and three to the left hand side; each unit being enclosed in a tube 25 preferably consisting of card board. The cells are urged into good electrical contact by a spring 20. One end of this spring abuts the bottom 19 of the end cell of a group of three, the other is inserted in an opening provided in the brass cap 21. As a rule we only use brass caps to cover the end of those carbon rods that are in the center cells. The other carbons may remain uncovered. Each stack of six cells in its cardboard tube 25 forms a unit that is easily handled.

Since each dry cell has a voltage of 1½ volts for a battery of 90 volts, sixty cells are required. We, therefore, use ten piles of six cells each and arrange them as shown in Figs. 1 and 2. A metal tape 26 extends around the assembled battery and serves to hold the blocks 15 in place, the tape itself is fastened by crimping its ends as shown at 23. In some cases it may be desirable to place the battery as a whole in a case, but this is not essential, and therefore, not shown in the drawings.

Figure 10:
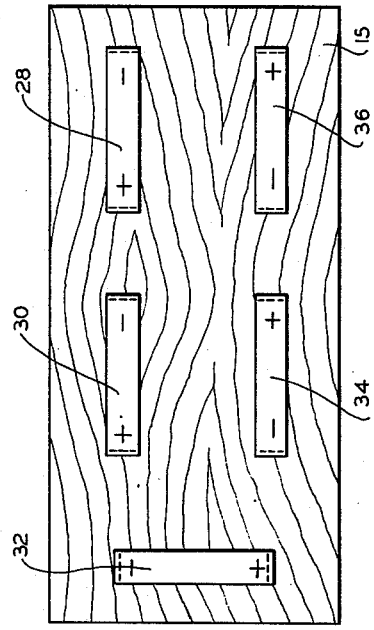
Figs. 9 and 10 are right hand and left hand end views of the battery.
Figure 9:
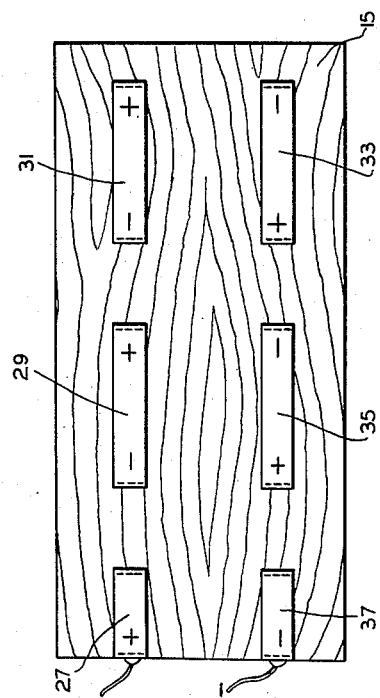

The manner in which the piles are electrically connected is best shown in Figs. 7 to 10. Fig. 7 illustrates a terne plate contact strip 27 which is used for the connection in side view. Fig. 8 shows the same in end view. Supposing strip 27 in Fig. 9 is the contact strip leading to the carbon electrode of pile number 1, the positive pole of the battery, current will flow through that pile, the contacts between each zinc bottom of one cell and the carbon electrode of the next cell being directly made. At the end of pile No. 1 the zinc cup is connected to the first carbon electrode of pile No. 2 by strip 28 (Fig. 10). In a similar manner, strip 29 makes connection between the negative end of pile number 2 and the carbon electrode of pile number 3 (Fig. 9). Strip 30 serves in exactly the same way as described for strip 28 and strip 31 serves the same purpose. Strip 32 connects the zinc electrode of the fifth pile with the carbon electrode of the sixth pile, thus leading over to the piles arranged in another vertical plane. Strip 33 makes the next connection at the other end of pile 6 and so forth over strip 34, 35, 36 until the last strip 37 makes contact with the last zinc electrode forming thereby the negative contact point for the battery when the same is used to capacity.

Fig. 3 shows a modification of the battery according to the invention, in which the general arrangement of piles is the same as described with reference to Figs. 1 and 2; the only feature that differs is the member for holding cells 16 in place. Instead of a spring a resilient cap 38 is used for that purpose, which cap covers the carbon electrodes in the center cells of each pile. Figs. 5 and 6 illustrate this cap on an enlarged scale. As seen from these figures the cap 38 has two slots 39 punched on its top and the narrow strip 40 formed thereby is slightly raised, being thus made into a yielding element that acts like a spring in holding the cells in place. In Fig. 3, which shows the cells in approximately natural size, strip 40 does not appear because it is too small to be shown in that scale, the natural width of the strip being about $\frac{1}{16}$ of an inch and its elevation over the plane of the cap a small fraction of the same.

In the embodiment shown in Fig. 11 no spring or other yielding element is used, but we rely on the dished bottom 4 of the zinc cup to form with the uncovered top of the carbon electrode 18 a safe connection that will not slip, but hold the cells in place.

Having thus described our invention, what we claim is:

A dry battery comprising a plurality of dry cell units, each unit comprising an open ended tube containing a plurality of dry cells arranged in end to end relation with the negative pole of one cell in contact with the positive pole of the next adjacent cell, and a pair of spaced end blocks carrying connecting contact straps thereon, said straps comprising flat metallic strips having laterally projecting tines thereon embedded in said blocks to permanently position the same thereon, said units being stacked directly one upon another between said blocks with the electrodes of one unit reversed with respect to the electrodes of the next adjacent unit and with the contacts of the end units in contact with the connecting straps on said blocks, and resilient means between the dry cells at the center of each unit for electrically connecting the same and for urging the dry cells on either side thereon in opposite directions towards said blocks to cause contact between the end cells and said contact straps and a band encircling said stacked units and blocks and clamping the units against removal from between the blocks.

CYRIL P. DEIBEL.
LEWIS A. GRAY.